(12) United States Patent
Lecha et al.

(10) Patent No.: US 7,525,977 B1
(45) Date of Patent: Apr. 28, 2009

(54) CONTROL MECHANISM FOR MAPPING CELLS AND PACKETS

(75) Inventors: Eduard Lecha, Fremont, CA (US); Vasan Karighattam, Davis, CA (US); Steve J. Clohset, San Francisco, CA (US); Soowan Suh, San Ramon, CA (US); Jing Ling, Fremont, CA (US); Juan-Carlos Calderon, Fremont, CA (US); Jean-Michel Caia, San Francisco, CA (US)

(73) Assignee: Intel Corporation, Santa Clara, CA (US)

( * ) Notice: Subject to any disclaimer, the term of this patent is extended or adjusted under 35 U.S.C. 154(b) by 1035 days.

(21) Appl. No.: 10/880,745

(22) Filed: Jun. 29, 2004

(51) Int. Cl.
*H04L 12/28* (2006.01)

(52) U.S. Cl. .................. 370/411; 370/412

(58) Field of Classification Search .............. None
See application file for complete search history.

(56) References Cited

U.S. PATENT DOCUMENTS

| | | | |
|---|---|---|---|
| 7,177,314 B2 * | 2/2007 | Wu et al. | 370/395.51 |
| 2003/0108069 A1 * | 6/2003 | Yamada | 370/535 |
| 2003/0227906 A1 * | 12/2003 | Hallman | 370/352 |
| 2004/0213299 A1 * | 10/2004 | Gupta et al. | 370/539 |

* cited by examiner

*Primary Examiner*—Edan Orgad
*Assistant Examiner*—Jung Park
(74) *Attorney, Agent, or Firm*—Blakely, Sokoloff, Taylor & Zafman LLP

(57) ABSTRACT

A device for mapping and demapping cells in an orderly manner is provided. The device employs a channel identifier and in certain configurations a buffer and series of stages to provide for relatively ordered, predictable mapping and demapping of data, such as virtual concatenation data.

12 Claims, 5 Drawing Sheets

CONTROL MECHANISM FOR MAPPING CELLS AND PACKETS

BACKGROUND OF THE INVENTION

1. Field of the Invention

The present invention relates generally to the field of high speed data transfer, and more specifically to mapping cell or packets in accordance with the SONET/SDH architecture.

2. Description of the Related Art

Data transmission over fiber optics networks may conform to the SONET and/or SDH standards. Data may be processed using a mapper, where the mapper reads and processes packets from system queues and adds idle packets or cells when the queues are empty. The mapper conforms to SONET/SDH requirements as well as the SPI-4 Phase 2 requirements. SONET and SDH are a set of related standards for synchronous data transmission over fiber optic networks. SONET is short for Synchronous Optical NETwork and SDH is an acronym for Synchronous Digital Hierarchy. SONET is the United States version of the standard published by the American National Standards Institute (ANSI). SDH is the international version of the standard published by the International Telecommunications Union (ITU). As used herein, the SONET/SDH and SPI-4 Phase 2 concepts are more fully detailed in various documents, including but not limited to the discussion of SPI-4, Phase 2, in the Optical Internetworking Forum (OIF Document) OIF-SPI4-02.1 and the discussion of concatenated payloads in ITU-T G.707 2000, T1.105-2001 (draft), and T1.105.02-1995.

SONET/SDH may employ payloads called virtually concatenated payloads. Virtual concatenation, as differentiated from contiguous concatenation, partitions the payload into virtual containers that may be provided with a single index and transmitted at one time, but may be received and processed at different times. Virtual concatenation allows for data delays through the network where the receiving entity can reassemble the payload irrespective of the time the payload components are received.

When using a mapper conforming to the aforementioned SONET/SDH and SPI-4 Phase 2 requirements, the bandwidth of each constituent signal in the SONET/SDH frame may change dynamically, or on the fly, during packet reading and processing. Data requests from the SONET/SDH frame builder blocks to the mappers do not follow a constant or uniform sequence, and may be received out of order or in a random order. For example, data in virtually concatenated payloads may be received at anytime and are based on the amount of delay incurred while traveling through the network. These blocks may be unavailable on an as needed, cycle by cycle basis.

In accordance with the framing and mapping process, it may be beneficial to have data available from different blocks and packets, such as from different virtual concatenation groups, on a cycle by cycle basis.

DESCRIPTION OF THE DRAWINGS

The present invention is illustrated by way of example, and not by way of limitation, in the figures of the accompanying drawings in which.

DETAILED DESCRIPTION OF THE INVENTION

The present design provides for use of a Channel Identifier (CID) sent with each data request in each cycle. Use of this CID enables cycle-by-cycle access to data, such as virtual concatenation data, from the mapper to the VCU (Virtual Concatenation Unit) and from the SIF (System Interface device) to the mapper in the mapping process, and from the VCU to the mapper and the mapper to the SIF in the demapping process. In the present design, relatively ordered and predictable data access is provided so that changes in virtual concatenation receipt or processing minimizes the likelihood of "starving" downstream components of data.

SONET/SDH framer devices are configured to multiplex and demultiplex signal components based on a TDM or time division multiplex scheme. Each such framer device may have the ability to carry and process different payload types. Certain payloads include data traffic, where data traffic includes packets that may be statistically multiplexed from different queues that may not have a constant packet rate.

SONET uses a basic transmission rate of STS-1, equivalent to 51.84 Mbps. Higher level signals are integer multiples of the base rate. For example, STS-3 is three times the rate of STS-1, i.e. three times 51.84 or 155.52 Mbps, while an STS-12 rate would be twelve times 51.84 or 622.08 Mbps. The SONET architecture employs frames, where the frame is generally divided into two main areas: transport overhead and the synchronous payload envelope, or SPE. The SPE comprises two components, namely STS path overhead and payload. The payload is the traffic being transported and routed over the SONET network. Once the payload is multiplexed into the SPE, the payload can be transported and switched through SONET without having the need to be examined and possibly demultiplexed at intermediate nodes.

Figure 1:
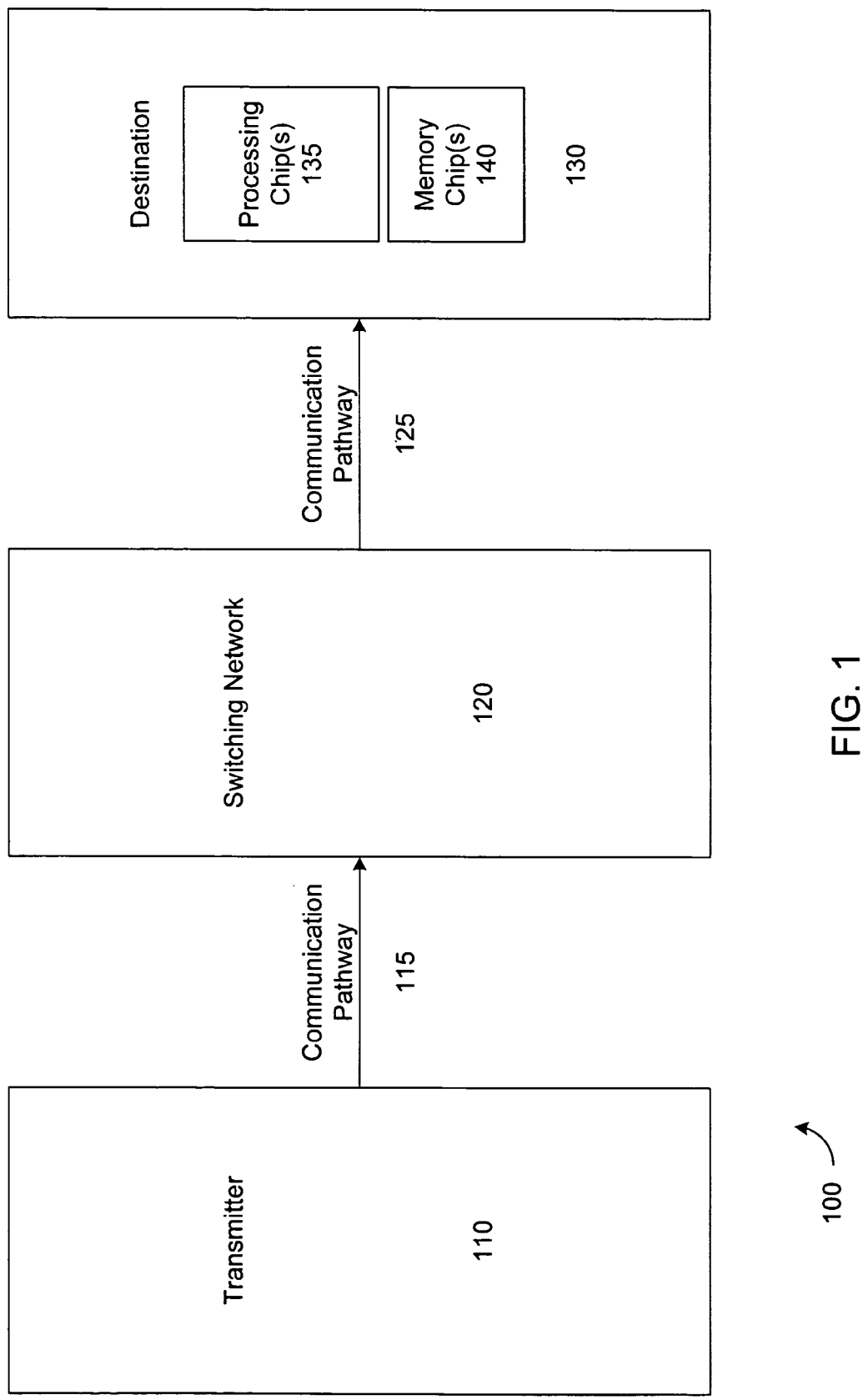
FIG. 1 is a typical SONET/SDH switching system.

A typical SONET/SDH switching system 100 is shown in FIG. 1. In the SONET/SDH switching system 100, a transmitter 110 is connected through a communication pathway 115 to a switching network 120. Switching network 120 is connected through a communication pathway 125 to a destination 130. The transmitter 110 sends a frame as a series of payloads to the destination 130 through the switching network 120. In the switching network 120, packets typically pass through a series of hardware and/or software components, such as servers. As each payload arrives at a hardware and/or software component, the component may store the payload briefly before transmitting the payload to the next component. The packets proceed individually through the network until they arrive at the destination 130. The destination 130 may contain one or more processing chips 135 and/or one or more memory chips 140. The framer or framer device (not shown in this view) is included in the destination 130, and the mapper (also not shown here) is part of the framer.

Virtual concatenated payloads are streams of data bytes that may be received by the framer as part of one or more SONET/SDH signals. In virtual concatenation, each SPE within a concatenated group representing the data frame for transmission contains an identifier, called a Multi-Frame Identifier, or MFI. The MFI forms part of the SONET/SDH path overhead information in the SPE and indicates the SPE's sequence and position within the group. As may be appreciated, the ability to identify the individual payloads by the MFI provides the ability for the system to split the payloads into various sizes or configurations, as long as the MFI is provided with each payload.

Virtual concatenation does not require intermediate node support, so the destination 130 for the network is the only specialized hardware required. The destination 130 reassembles the SPEs in the correct order to recover the data. To compensate for different arrival times of the received data, a phenomenon known as differential delay, the receiving circuits has typically contained some buffer memory so that the data can be properly realigned.

Figure 2:
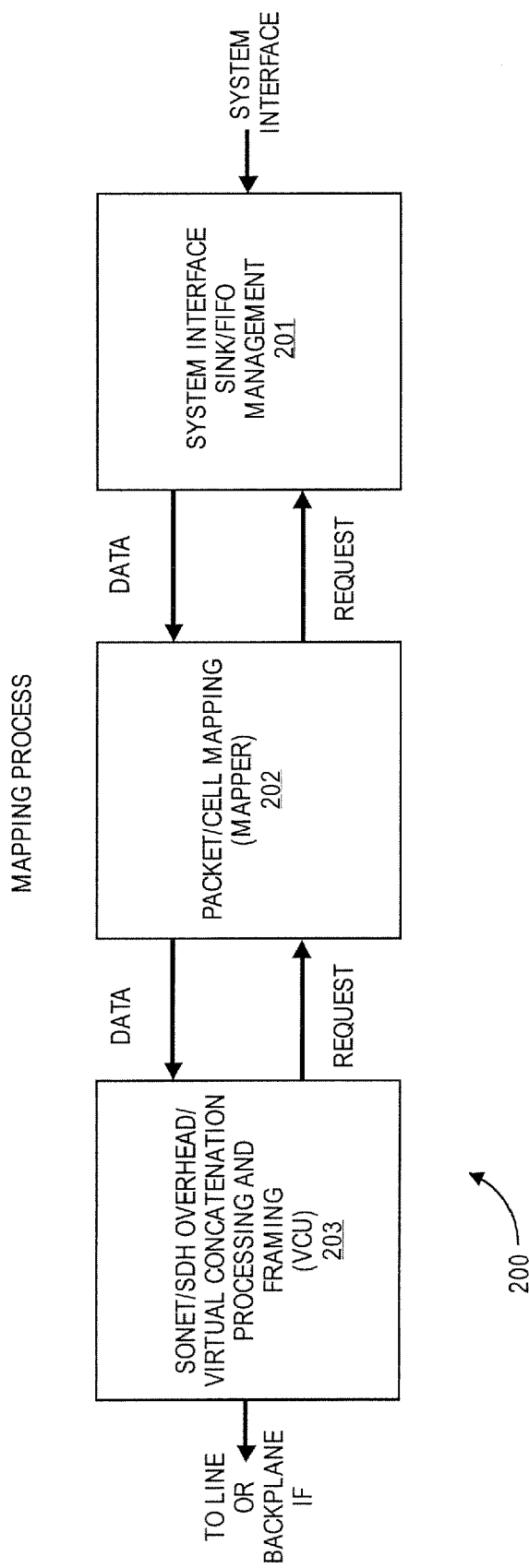
FIG. 2 illustrates the mapping process for virtual concatenated data.

FIG. 2 illustrates the framer 200 and mapping process according to the SONET/SDH architecture. From FIG. 2, the system interface provides data from a network processor, MAC (Media Access Controller), switch, or traffic manager. Data is received by the system interface Sink 201, which provides FIFO (First In First Out) management. System Interface Sink 201 provides data to the mapper 202, which in turn sends data to the SONET/SDH Overhead, Pointer, and Virtual Concatenation Processor and Framer (VCU) 203, which transmits framed data to the line or backplane interface. The SONET/SDH Overhead, Pointer, and Virtual Concatenation Processor and Framer (VCU) 203, when operating on virtual concatenation data, is called the VCU, or virtual concatenation unit. Requests for data are provided from the SONET/SDH Overhead, Pointer, and Virtual Concatenation Processor and Framer (VCU) 203 to the mapper 202, and in turn from the mapper 202 to the System Interface Sink 201. In this direction, from system interface to line or backplane interface, the system interface receives packets or cells and the framer stores the packets or cells in queues. The framer reads data from these queues when needed to build the SDH containers. The mapper 202 reads and processes packets from the system queues and adds idle packets or cells when the queues are empty.

Figure 3:
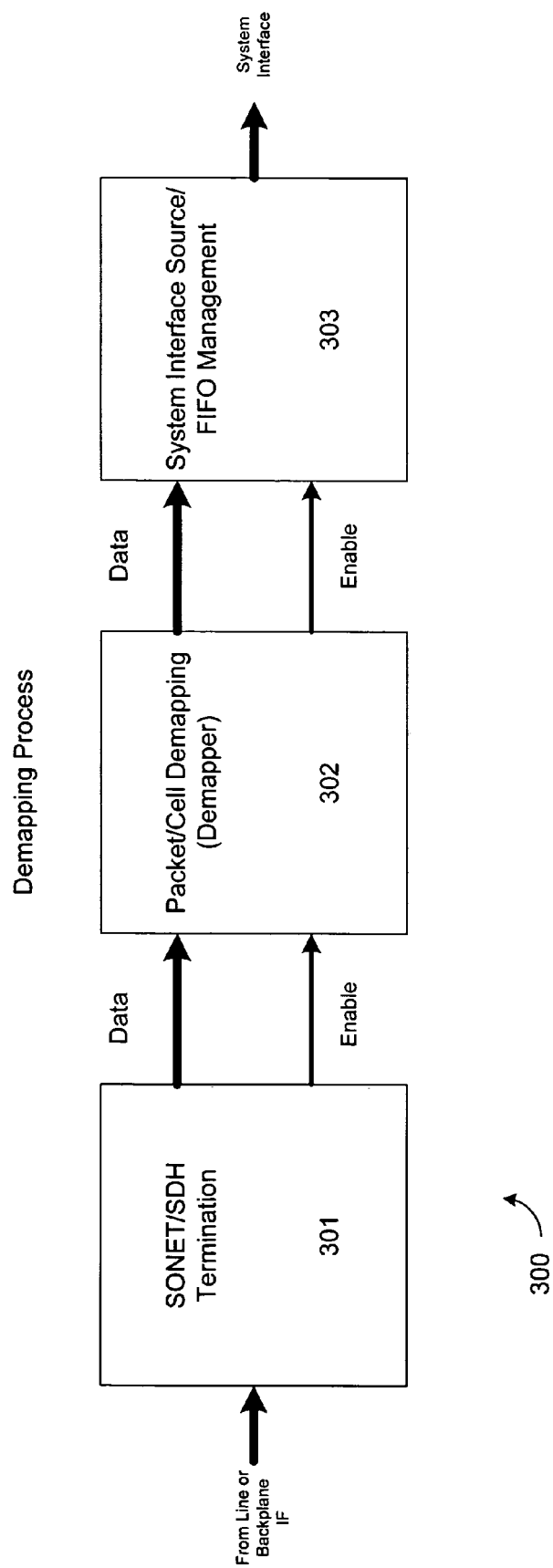
FIG. 3 shows the demapping process for virtual concatenated data.

FIG. 3 shows the framer 300 and the demapping process, where framed data is received from the line or backplane interface at the SONET/SDH termination point 301. Data is provided from the SONET/SDH termination point 301 to the demapper 302, and from the demapper 302 to the System Interface Source 303. Data is then provided from the System interface Source 303 to the system interface, and on to the network processor, MAC (Media Access Controller), switch, or traffic manager. Enable signals are provided from SONET/SDH termination point 301 to the demapper 302, and from the demapper 302 to the System Interface Source 303. In this receive direction, the framer extracts packets or cells from the SONET/SDH containers (payload), and the framer filters, processes, and writes the de-mapped data into the system queue.

As may be appreciated, the problem with such an arrangement is starving the mapper/demapper of data. If an insufficient amount of data is available in the transmit direction of FIG. 2, a significant number of idle packets or cells must be used. In the receive direction of FIG. 3, an insufficient amount of data received from the line or backplane interface may cause the demapper to wait for new data, which is undesirable.

The present design employs a channel identifier signal that determines which specific group or channel, such as which specific virtual concatenation group or channel, corresponds to the request (in the transmit direction of FIG. 2) or data (in the receive direction of FIG. 3). The system queues store data for each channel separately and the system interface sink or source, generically termed the SIF here, maps each CID with a unique address at the SPI-4 interface.

Figure 4:
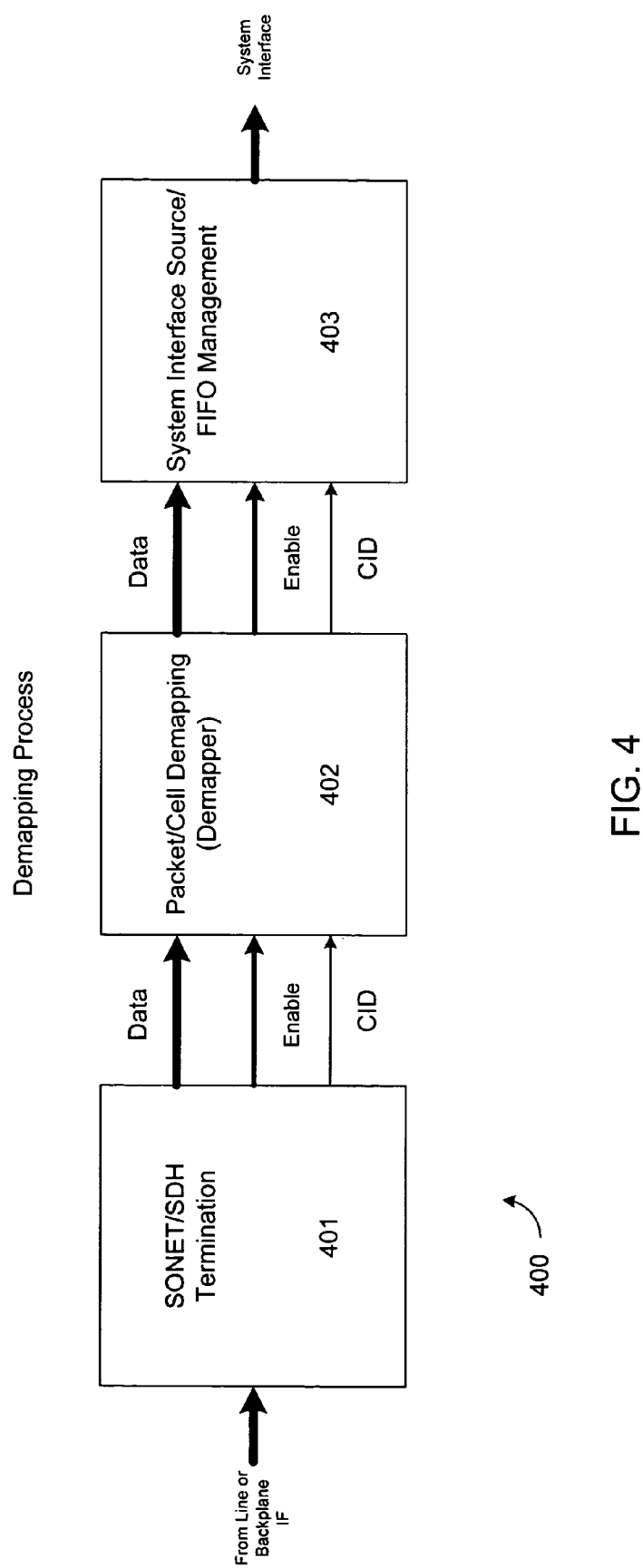
FIG. 4 illustrates the demapping process of the present design using channel identifiers.

The receive direction is illustrated in FIG. 4. In the receive direction, the VCU, or virtual concatenation unit or processor 401 is similar to the SONET/SDH Overhead, Pointer, and Virtual Concatenation Processor and Framer 203 of FIG. 2, but operates on virtual concatenation data. The VCU 401 operates to decompensate the data received and assemble the payload for the various channels. The VCU 401 sends three items to the demapper 402, namely a data word, a CID associated with the data word, and a validity indication or enable signal. The demapper 402 maintains a context or index for each CID in the various demapper stages, and demapper can load this context or index each clock cycle. Data in this configuration and the enable signal are both associated with the CID when transmitted from the VCU 401 to the demapper 402 and from the demapper 402 to the SIF 403. The CID from the VCU then passes from the mapper to the SIF 403 after a fixed number of clock cycles. Thus in the receive direction, use of the CID provides for an indexing of the data received which, when coupled with the enable signal, may be used by the demapper 402 to index data and provide indexed data from the demapper 402 to the SIF 403 together with the CID. This indexing using the CID enables data to be stored at the appropriate time and data to be deconstructed and passed to the SIF 403 in coordinated data groups at specified times. Thus the demapper has sufficient storage to store packets received according to context, and to pass them through in a constant, ordered sequence.

Figure 5:
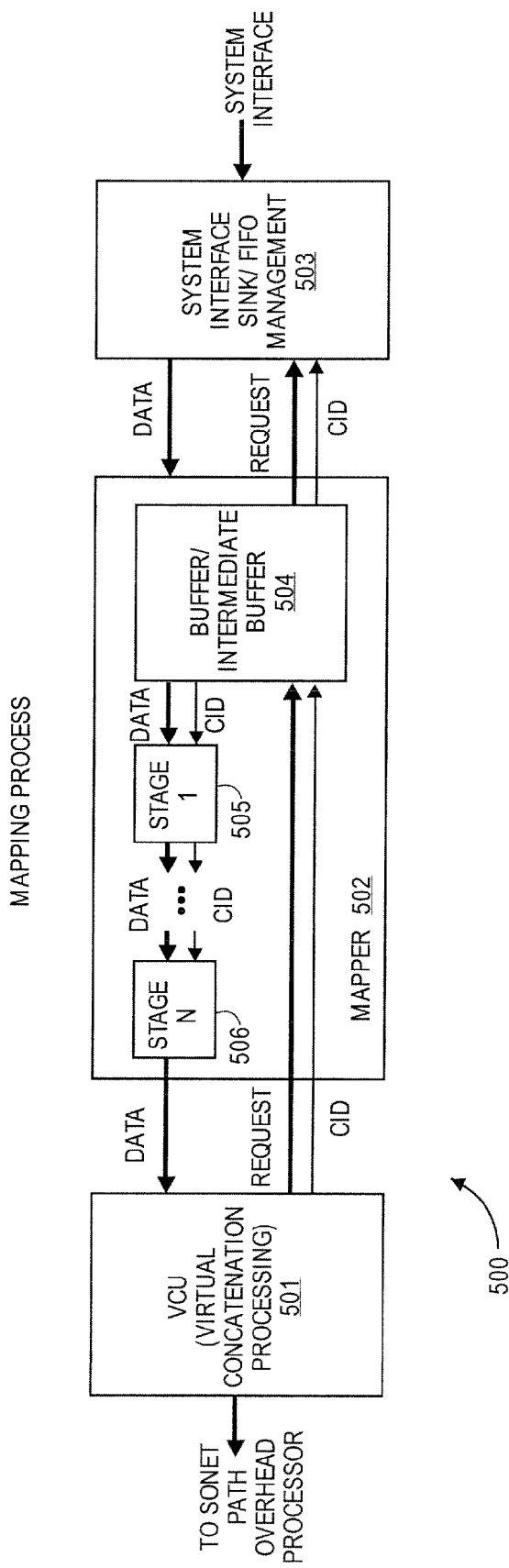
FIG. 5 shows the mapping process of the present design using channel identifiers, a buffer or intermediate buffer, and a series of stages.

FIG. 5 illustrates the transmit direction according to the present design. From FIG. 5, the VCU or virtual concatenation processor 501 transmits the request for data to mapper 502, which in turn transmits a request for data to the SIF 503. Data words travel from the SIF 503 to the mapper 502 and then to the VCU 501. The VCU transmits a data request associated with a channel identifier or CID to the mapper 502 each cycle. The mapper 502 maintains an intermediate buffer 504 with data from each channel. If the intermediate buffer 504 contains data, received from SIF 503 but not yet passed from the intermediate buffer 504, the mapper 502 uses the data contained in the intermediate buffer 504 to build a data word to acknowledge the request transmitted by the VCU 501. If the intermediate buffer 504 is empty, the mapper 502 builds an idle packet and transmits the idle packet to the VCU to indicate receipt of the data request.

As shown in FIG. 5, the data propagates through a series of stages, stage 1 through stage N, wherein intermediate buffer 504 provides the data and the CID to stage 1 506, stage 2, stage 3, (both not shown) and up to stage N 507. Fewer stages mean a lower number of cycles, and less latency, for the data coming from SIF 503 to reach the line interface. At each stage, a different function of the mapping process may be performed. Typical mapping functions may include idle insertion, header insertion, CRC calculation, scrambling, and so forth. The number of cycles from VCU output data request until the VCU 501 receives data back from the mapper is fixed. In this way, the VCU 501 knows which received data word corresponds to which data request sent. The number of cycles from data request to data receive by VCU 501 corresponds to the number of stages or clock cycles in the mapper, plus the number of cycles for the SIF 503 to deliver data once the SIF 503 receives a data request from the mapper.

The number of stages varies for different mappers. In any configuration, the amount of latency is fixed. For a typical implementation, 16 stages may be employed, resulting in 27 cycles before the VCU receives indication that data has been received.

This implementation, including use of the intermediate buffer 504, fixes the number of clock cycles from the time the VCU 501 transmits the data request until the time the mapper 502 provides a response in the form of a data word back to the VCU 501.

The mapper 502 may also propagate the data request to the SIF 503 depending on the buffer level for the channel and the number of requests previously transmitted and not serviced for the same channel. In other words, if data is needed for a channel having the channel CID transmitted by the VCU 501 to the mapper 502, the mapper 502 requests data for that channel from the SIF 503 and can receive the requested data and have time to load the data while data is propagating through the mapper stages. The SIF 503 reads from the system queues when it receives such a data request from the mapper 502, and the SIF 503 acknowledges the data request after a period of time, indicating data for the channel is available or unavailable.

The total latency that VCU sees is fixed for all data requests and independent on the availability of data in the intermediate buffer.

In FIG. 5, the CID is not transmitted back from the SIF 503 to the mapper 502 or the mapper 502 to the VCU 501. The latency or delay is fixed for both the mapper 502 and the SIF 503, and thus the requesting VCU 501 or mapper 502 will know the CID of data received at the known later time. Thus transmitting the CID back from the SIF 503 to the mapper 502 and the mapper 502 to the VCU 501 is unnecessary.

In summary, the current staging scheme overcomes previous issues with timing of requests and availability of data, particularly in situations where the bandwidth of a virtual concatenation group is modified during receipt of the virtual concatenation group. The present staging design gives the mapper 502 and the SIF 501 time and additional opportunity to "catch up" by providing a fixed amount of time before data must be delivered back to the VCU. The buffering and staging therefore facilitates seeking of data from the SIF 503 and holding and propagating as much data as possible back to the VCU 501 subsequent to a request received from the VCU 501.

It will be appreciated to those of skill in the art that the present design may be applied to other systems that perform data processing, and is not restricted to the communications structures and processes described herein. Further, while specific hardware elements and related structures have been discussed herein, it is to be understood that more or less of each may be employed while still within the scope of the present invention. Accordingly, any and all modifications, variations, or equivalent arrangements which may occur to those skilled in the art, should be considered to be within the scope of the present invention as defined in the appended claims.

What is claimed is:

1. A device for mapping virtual concatenation data into a frame based on a request for virtual concatenation frame mapping from a virtual concatenation processing device, comprising:
   a buffer configured to receive the request from the virtual concatenation processing device in addition to a channel identifier associated with the request and further configured to transmit a buffer request for additional virtual concatenation data along with a buffer channel identifier associated with the buffer request; and
   a series of stages connected in series between the buffer and the virtual concatenation processing device and configured to propagate the virtual concatenation data from the buffer back to the virtual concatenation processing device,
   wherein propagation of the virtual concatenation data through the series of stages establishes a fixed delay from transmission of the request until the virtual concatenation data arrives at the virtual concatenation processing device.

2. The device of claim 1, wherein a delay associated with the series of stages and data propagation through the series of stages enables the buffer to transmit the buffer request to seek additional virtual concatenation data from a remote device.

3. The device of claim 2, wherein the remote device is a system interface sink.

4. The device of claim 3, wherein the buffer transmits the channel identifier to the remote device together with the buffer request.

5. The device of claim 1, wherein the series of stages propagates the channel identifier in addition to the virtual concatenation data.

6. The device of claim 1, wherein absence of data in the buffer causes the device to prepare an idle packet and transmit the idle packet through the series of stages.

7. The device of claim 1, wherein each stage holds one word of virtual concatenation data.

8. A device for processing virtual concatenation data, comprising:
   a system interface sink;
   a mapper connected to the system interface sink, the mapper comprising a buffer and a series of stages connected in series to the buffer; and
   a virtual concatenation processor connected to the mapper,
   wherein the virtual concatenation processor is capable of transmitting a request for virtual concatenation data along with an associated channel identifier to the buffer of the mapper,
   wherein the buffer is capable of transmitting a buffer request for virtual concatenation data along with an associated buffer channel identifier to the system interface sink, and
   wherein propagation of the virtual concatenation data through the series of stages establishes a fixed delay from transmission of the request until the virtual concatenation data arrives at the virtual concatenation processor.

9. The device of claim 8, wherein:
   the buffer operates on the request for virtual concatenation data by transmitting the buffer request and associated buffer channel identifier to the system interface sink and initiates propagation of virtual concatenation data through the series of stages to the virtual concatenation processor.

10. The device of claim 8, wherein:
    an absence of virtual concatenation data from the buffer for a channel identified by the channel identifier causes the mapper to propagate an idle packet through the series of stages.

11. The device of claim 8, wherein upon receipt of the buffer request and the buffer channel identifier, the system interface sink reads system queues for virtual concatenation data corresponding to the channel identifier.

12. The device of claim 11, wherein upon identifying virtual concatenation data corresponding to the channel identifier, the system interface sink transmits data to the buffer without the buffer channel identifier.

* * * * *